May 4, 1937.  J. E. TRAINER  2,079,265
WELDING
Filed Sept. 25, 1934
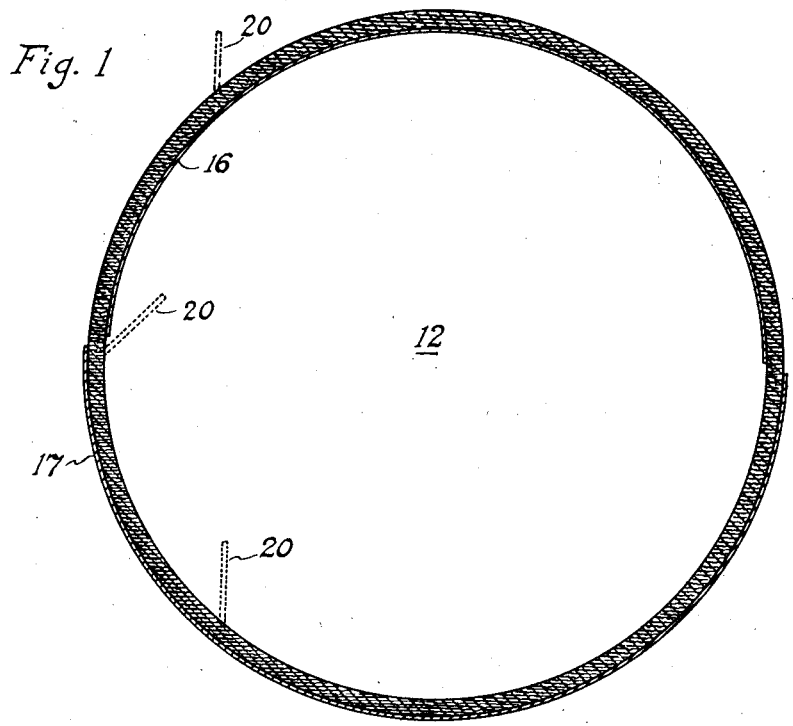
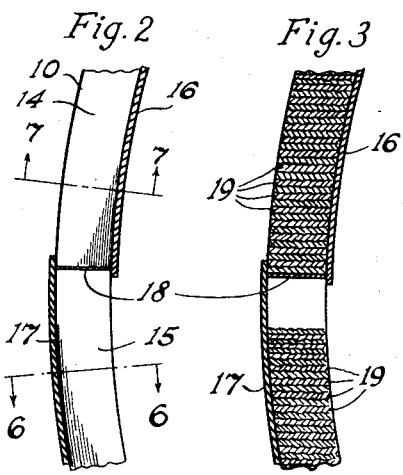 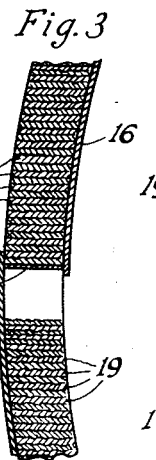 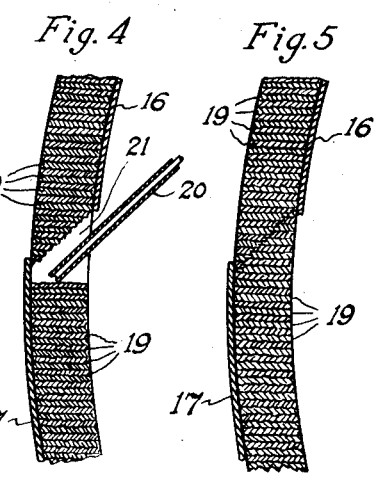 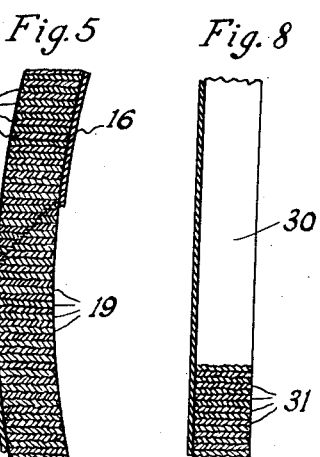 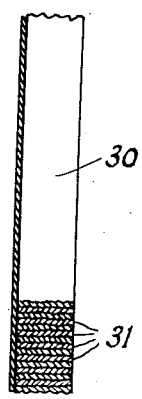
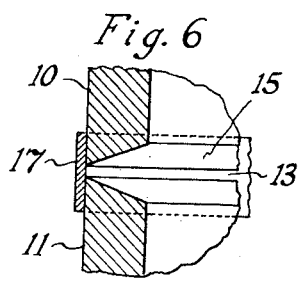 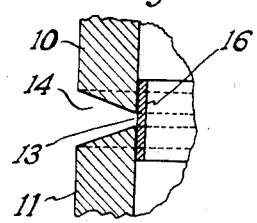
INVENTOR
James E. Trainer
BY
ATTORNEY Patented May 4, 1937

2,079,265

UNITED STATES PATENT OFFICE 2,079,265

WELDING

James E. Trainer, Akron, Ohio, assignor to The Babcock & Wilcox Company, Newark, N. J., a corporation of New Jersey Application September 25, 1934, Serial No. 745,382

2 Claims. (Cl. 219—10)

My invention relates to electric arc welding, and it has for a broad object the provision of an improved method of welding metallic sections together.

In the welding together of metallic sections to form large hollow bodies, for example, spheres, conduits, tanks and the like, which are of a size impractical to move; portions of the seam or seams to be welded, which are defined by the adjacent edges of sections, are so disposed that under usual conditions the weld metal is deposited in the seam from beneath the sections. This is commonly referred to as "overhead welding". Other portions of the seams are so arranged that their longitudinal axes extend in vertical or nearly vertical directions. The depositing of weld metal in the latter type of seam is generally referred to as "vertical welding".

Unless the operator possesses exceptional skill, a good sound weld is not usually obtained by overhead welding because it is difficult to keep the molten weld metal at the spot being welded. This difficulty is even more pronounced when coated or covered electrodes are used, due to the high degree of fluidity resulting from the fluxing agent in the coating.

Difficulty is also experienced in obtaining a good weld in vertical seams according to prior methods where the weld metal is deposited in bead layers extending longitudinally of the seam, because of the tendency of the molten metal to flow away from the spot being welded.

It is a further object of the present invention to provide an improved method of arc welding whereby overhead welding is eliminated, thus permitting the use of slag forming coating on rods in welding metallic sections to form large hollow bodies impractical to move, and at the same time facilitating welding of seams in such bodies even with bare or other types of rods.

A still further object of my invention is the provision of an improved method of depositing weld metal in a seam defined by the adjacent edges of metallic sections where the longitudinal dimension of the seam is vertical or approaches the vertical, whereby a sound weld is obtained.

The above and other objects will be apparent from an examination of the following description taken in connection with the accompanying drawing; in which:—

Fig. 1 is a vertical sectional view through a circumferential or girth joint between the adjacent ends of two sections of a conduit, tank or the like, wherein the weld metal has been deposited in accordance with my improved method;

Fig. 2 is a fragmentary vertical section through a portion of the welding groove as prepared for the reception of the weld metal;

Fig. 3 is a view similar to Fig. 2 and showing the weld metal as having been completely deposited in one of the grooves formed between the adjacent edges of the two sections, and partially deposited in the other of the grooves;

Fig. 4 is a view similar to Figs. 2 and 3, illustrating the manner in which a portion of the previously deposited weld metal in one of the grooves and the adjacent parent metal is removed to form an extension of the other groove so that the welding of the seam may be completed;

Fig. 5 is a view similar to Fig. 4 illustrating the completed weld;

Fig. 6 is a fragmentary horizontal section taken on the line 6—6 of Fig. 2 and illustrating the lower groove defined by adjacent edges of the two sections to be welded;

Fig. 7 is a fragmentary horizontal sectional view illustrating the upper groove defined by the adjacent edges of the sections to be welded; and Fig. 8 is a fragmentary vertical sectional view illustrating my improved method as applied to the welding of two sections, wherein the longitudinal axis of the welding groove is disposed in a substantially vertical direction.

I have illustrated in Figs. 1 to 7 inclusive, of the accompanying drawing my improved method as used in the welding together of adjacent sections 10 and 11 of a large conduit or tank 12, the sections being arranged in end-to-end relation to provide a girth or circumferentially-extending seam 13. It is assumed that the conditions are such that it is impractical to move the article being worked on and that the sections are of sufficient size to permit a welding operator or operators to enter the sections. Although my invention is especially applicable to the conditions just stated, it will be apparent as the description proceeds that, insofar as certain aspects of my invention are concerned, it is not limited in its application to either or both of these conditions.

Preparatory to depositing the weld metal, I provide between the adjacent sections two welding grooves 14 and 15 which meet at their ends, as shown in Fig. 2. The welding groove 14 may be of the conventional V-shape and extends about the upper half of the periphery of the conduit 12 and opens outwardly, a suitable backing-up strip 16 being positioned at the back side of the groove to hold the weld metal. The welding groove 15 may also be V-shaped in cross section and extends for the lower half of the conduit 12 and opens inwardly of the conduit, a backing-up strip 17 being secured at the back side of the groove 15 (see also Figs. 6 and 7).

The weld metal is preferably first deposited from the exterior of the conduit in the upper groove 14, beginning at the lower ends thereof and working toward the upper center. Previous to welding, a small strip 18 may be placed in each lower end of the groove 14 for closing the lower ends of the groove 14. The weld metal is deposited in successive bead layers 19 extending horizontally, as shown. The weld metal is then deposited from the interior of the conduit in the lower groove 15, beginning in the lower center thereof and working up the sides toward the ends thereof. As before, the weld metal is deposited in successive bead layers 19 extending horizontally. Various positions of the electrodes 20 during the welding operation are indicated in dotted lines in Fig. 1.

In order to avoid under cutting and to provide a sound weld at the junction of the grooves, a portion of the backing-up strip 16, the strip 18, and the previously deposited weld metal at the lower ends of the groove 14 are removed from the back side of the groove 14 by any suitable means, for example, by chipping, or the like, and sufficient adjacent parent metal is also removed to provide tapered extensions 21 to the ends of the inwardly-opening groove 15 (see Fig. 4). The remaining portions of the groove 15 and the extensions 21 may be filled with weld metal in the manner above stated to provide a sound welded joint. The remaining portion of the backing-up strip 16 and the backing-up strip 17 may then be removed, if it is desired.

From the above, it will be apparent that I have eliminated the necessity for overhead welding. Furthermore, as the weld metal is laid in horizontal layers, particularly the weld metal in that portion of the grooves which approaches the vertical the weld metal will not tend to flow away from the spot being welded and a sound weld will be obtained throughout; and this is true with covered or coated electrodes as well as with bare electrodes.

It is to be noted that while I have explained the preferential procedure of welding first the upper groove 14 and then the lower groove 15, my invention is also applicable to cases where the lower groove 15 is welded first, or where both grooves are welded at the same time. Under certain conditions, a number of operators may be depositing weld metal at the same time, for example, there could be operators depositing weld metal at each side of the upper groove 14 and at each side of the lower groove 15. Thus, my improved method makes possible a sound weld in a comparatively short period of time.

In Fig. 8, I have shown my method of welding as applied to a seam 30, the longitudinal axis of which extends vertical. The beads 31 of weld metal extend horizontally, and are successively deposited from the lower portion of the seam towards the top. This method is particularly advantageous over the conventional method of laying the beads longitudinally of the seam, due to the fact that the weld metal, even though it possesses a characteristic of having a high degree of fluidity, will remain at the spot deposited and solidify to provide a sound weld.

While I have shown my invention in two forms, it will be obvious to those skilled in the art that it is not limited but is susceptible of various other changes and modifications without departing from the spirit thereof, and I desire, therefore, that only such limitations shall be placed thereupon as are imposed by the prior art or as are specifically set forth in the appended claims.

I claim:—

1. In a method of circumferentially welding adjacent ends of two contiguously arranged sections of a tubular member which extends at a substantial angle to the vertical, the steps which comprise forming between the adjacent ends of the sections an outwardly-opening welding groove which extends for substantially the upper half of the periphery of the tubular member; forming between the adjacent ends of the sections an inwardly-opening welding groove which extends for substantially the lower half of the periphery of the tubular member; filling one of said grooves with substantially horizontally extending beads of weld metal successively deposited beginning at the lowermost portions of the groove and working toward the upper portions thereof; removing the deposited weld metal at the back side of said one groove at the ends thereof and the adjacent parent metal of the sections to form extensions of the other groove which decreases in depth toward the outer ends thereof; filling the other groove with substantially horizontally extending beads of weld metal successively deposited beginning at the lower portions of the other groove and working toward the upper portions thereof.

2. In a method of circumferentially welding adjacent ends of two sections of a tubular member wherein the sections are arranged in end-to-end relations with their axes extending at a substantial angle to the vertical, the steps which comprise forming an outwardly-opening welding groove between the adjacent ends of the sections which extends substantially for the upper half of the periphery of the tubular member; forming an inwardly-opening welding groove between the adjacent ends of the sections which extend substantially for the lower half of the periphery of the tubular member; depositing from the exterior of the tubular member in the outwardly-opening groove substantially horizontally extending beads of weld metal; removing weld metal from the back side of the outwardly opening groove at the ends thereof and from the adjacent portions of the sections to provide extensions of the ends of the inwardly-opening grooves the depth of which decreases in an upward direction to provide tapered ends; depositing from the interior of the tubular members substantially horizontally-extending beads of weld metal in the inwardly-opening groove filling first the groove at the lower portions and then working up the sides of the groove to the tips of the tapered ends of the extensions.

JAMES E. TRAINER.